United States Patent
Jilani et al.

(10) Patent No.: US 12,255,359 B2
(45) Date of Patent: Mar. 18, 2025

(54) FUEL CELL STACK COMPRISING VARIABLE BIPOLAR PLATES

(71) Applicant: AUDI AG, Ingolstadt (DE)

(72) Inventors: Adel Jilani, Burnaby (CA); Sanjiv Kumar, Burnaby (CA); Radu P. Bradean, Burnaby (CA); Sebastian Voigt, Heilbronn (DE)

(73) Assignee: AUDI AG, Ingolstadt (DE)

( * ) Notice: Subject to any disclaimer, the term of this patent is extended or adjusted under 35 U.S.C. 154(b) by 637 days.

(21) Appl. No.: 17/607,335

(22) PCT Filed: Feb. 11, 2020

(86) PCT No.: PCT/EP2020/053422
§ 371 (c)(1),
(2) Date: Oct. 28, 2021

(87) PCT Pub. No.: WO2020/221481
PCT Pub. Date: Nov. 5, 2020

(65) Prior Publication Data
US 2022/0246949 A1    Aug. 4, 2022

(30) Foreign Application Priority Data
Apr. 29, 2019   (DE) ............... 10 2019 206 117.6

(51) Int. Cl.
*H01M 8/026*    (2016.01)
*H01M 8/0267*   (2016.01)
*H01M 8/1004*   (2016.01)
*H01M 8/1007*   (2016.01)

(52) U.S. Cl.
CPC ......... *H01M 8/026* (2013.01); *H01M 8/0267* (2013.01); *H01M 8/1004* (2013.01); *H01M 8/1007* (2016.02)

(58) Field of Classification Search
CPC ........................ H01M 8/026; H01M 8/0267
See application file for complete search history.

(56) References Cited

U.S. PATENT DOCUMENTS

| | | | |
|---|---|---|---|
| 7,041,408 B1 | 5/2006 | Meyers | |
| 9,413,016 B2 * | 8/2016 | Blanchet | ............... H01M 8/241 |
| 11,430,999 B2 * | 8/2022 | Kunz | ................... H01M 8/188 |

(Continued)

FOREIGN PATENT DOCUMENTS

| | | | |
|---|---|---|---|
| CN | 210200873 U | * | 3/2020 |
| DE | 102007008212 A1 | | 10/2007 |

(Continued)

OTHER PUBLICATIONS

Machine translation of KR 102016121506 (no date) (Year: 0000).*

(Continued)

*Primary Examiner* — Amanda C. Walke
(74) *Attorney, Agent, or Firm* — Seed IP Law Group LLP

(57) ABSTRACT

A fuel cell stack is provided comprising membrane electrode assemblies and bipolar plates for supplying the membrane electrode assemblies with operating media and coolant, wherein a first bipolar plate comprises flow pathways having path depths that are different from path depths of corresponding flow pathways of a second bipolar plate. Moreover, a vehicle with a fuel cell system having such a fuel cell stack is provided.

13 Claims, 5 Drawing Sheets

(56) References Cited

U.S. PATENT DOCUMENTS

| | | |
|---|---|---|
| 2011/0200903 A1 | 8/2011 | Hamada et al. |
| 2015/0004515 A1 | 1/2015 | Patterson, Jr. et al. |
| 2018/0248203 A1* | 8/2018 | Xu .................. H01M 8/021 |

FOREIGN PATENT DOCUMENTS

| | | | | |
|---|---|---|---|---|
| DE | 102016121506 A1 | | 5/2018 | |
| EP | 1686642 A1 | | 8/2006 | |
| JP | 2007536705 A | * | 12/2007 | |
| KR | 100826435 B1 | * | 4/2008 | |
| WO | WO-2016055510 A1 | * | 4/2016 | .......... H01M 8/0206 |
| WO | WO-2020098217 A1 | * | 5/2020 | .......... H01M 8/0228 |

OTHER PUBLICATIONS

International Search Report, mailed May 27, 2020, for International Application No. PCT/EP2020/053422, 5 pages.
International Preliminary Report on Patentability, mailed May 27, 2020, for International Application No. PCT/EP2020/053422, 7 pages.

* cited by examiner

FUEL CELL STACK COMPRISING VARIABLE BIPOLAR PLATES

BACKGROUND

Fuel cells use the chemical reaction of a fuel with oxygen to form water in order to generate electrical energy. For this, fuel cells contain as their key component the so-called membrane electrode assembly (MEA), which is a structure made from an ion-conducting (usually proton-conducting) membrane and a catalytic electrode (anode and cathode) arranged on either side of the membrane. The electrodes usually comprise precious metals on a substrate, especially platinum. Furthermore, gas diffusion layers (GDL) may be arranged on either side of the membrane electrode assembly on the sides of the electrodes facing away from the membrane. As a rule, the fuel cell is formed by a plurality of MEAs arranged in a stack, the electrical voltages of which are added up. Bipolar plates (also called flow field or separator plates) are generally arranged between the individual membrane electrode assemblies, ensuring a supplying of the individual cells with the operating media, i.e., the reactants, and usually also serving for a cooling. Moreover, the bipolar plates provide an electrically conductive contact with the membrane electrode assemblies.

In the operation of the fuel cell, the fuel (anode operating medium), especially hydrogen $H_2$ or a hydrogen-containing gas mixture, is supplied via a flow field of the bipolar plate which is open at the anode side to the anode, where an electrochemical oxidation of $H_2$ occurs, forming protons $H^+$ and giving off electrons ($H_2 \rightarrow 2 H^+ + 2 e^-$). A (water-bound or water-free) transport of the protons from the anode space to the cathode space occurs via the electrolyte or the membrane, which separates the reaction spaces gas-tight from each other and electrically insulates them. The electrons provided at the anode are taken by an electrical conduit to the cathode. The cathode is supplied with oxygen or an oxygen-containing gas mixture (such as air) as the cathode operating medium via a flow field of the bipolar plate which is open at the cathode side, so that a reduction of $O_2$ to $O^{2-}$ occurs, taking up the electrons ($\frac{1}{2}O_2 + 2 e^- \rightarrow O^{2-}$). At the same time, the oxygen anions in the cathode space react with the protons transported across the membrane to form water ($O^{2-} + 2 H^+ \rightarrow H_2O$).

The supplying of the fuel cell stack with its operating media, i.e., the anode operating gas (such as hydrogen), the cathode operating gas (such as air), and the coolant, occurs by main supply channels, which pass through the stack in its entire stack direction and from which the operating media are supplied across the bipolar plates to the individual cells. For each operating medium, there are at least two such main supply channels, namely, one for the supplying and one for taking away the particular operating medium.

Typically, bipolar plates consist of two half-plates, joined together, and being structured on either side. On the sides facing away from each other, structurings are required for the transport of the operating media, and on the sides facing each other structurings are needed for the transport of coolant. The half-plates need to be matched up with each other, since three separate transport pathways need to be provided by means of two half-plates. This leads to further boundary conditions which reduce the flexibility of the configurations of the bipolar plates. In typical configurations, the half-plates of known bipolar plates are profiled, and the profiles intermesh with or are nested in each other.

The cathode-side reaction produces water as the reaction product, and this needs to be removed from the fuel cells. Moreover, the reaction heat must be effectively taken away in order to avoid an overheating of the fuel cells. It has been found that difficulties exist in the fuel cell stack with the control of the production of heat as well as the removal of water.

BRIEF SUMMARY

Embodiments described herein provide control of the removal of the heat and the draining away of the water from fuel cells.

A fuel cell stack may comprise a stack of membrane electrode assemblies and bipolar plates situated in alternating manner between two end plates, wherein the bipolar plates comprise: an anode plate having an anode side and a coolant side as well as a cathode plate having a cathode side and a coolant side as well as a plurality of electrode-side flow pathways and a plurality of coolant-side flow pathways, characterized in that a first bipolar plate comprises at least one anode-side flow pathway having a path depth which is different from the path depth of at least one anode-side flow pathway of a second bipolar plate; and/or the first bipolar plate comprises at least one cathode-side flow pathway having a path depth which is different from the path depth of at least one cathode-side flow pathway of the second bipolar plate; and/or the first bipolar plate comprises at least one coolant-side flow pathway having a path depth which is different from the path depth of at least one coolant-side flow pathway of a second bipolar plate.

The fuel cell stack described herein thus solves the problems of fuel cell stacks in the prior art by the deliberate variation of the path depths in the stack direction. This makes possible a better control of the water drainage, as well as a better control of the removal of heat. Moreover, the flow across the cells can be optimized. The fuel cell stack described herein increases the design latitude for fuel cells, since the fuel cell stack can be individually configured according to the area of application.

According to one embodiment, a fuel cell stack is described wherein the first bipolar plate is situated in a first stack direction closer to a first end plate of the fuel cell stack than to the second bipolar plate and at least one of the coolant-side flow pathways of the first bipolar plate has a lesser depth than the depth of at least one of the coolant-side flow pathways of the second bipolar plate.

This makes possible a better control of the removal of heat. It takes into account the fact that the production of heat near the end plates is different from the production of heat at the center of the stack.

According to one embodiment, a fuel cell stack is described wherein the first bipolar plate is situated in a first stack direction closer to a first end plate of the fuel cell stack than to the second bipolar plate and at least one of the cathode-side flow pathways of the first bipolar plate has a greater depth than the depth of at least one of the cathode-side flow pathways of the second bipolar plate.

This makes possible a better control of the production of water. It takes into account the fact that the production of water near the end plates is different from the production of water of the rest of the stack.

According to one embodiment, a fuel cell stack is described wherein the bipolar plates on the anode side comprise anode-side structural elements for forming the anode-side flow pathways, and on the cathode side they comprise cathode-side structural elements for forming the cathode-side flow pathways, wherein the first bipolar plate comprises at least one anode-side structural element having a height which is different from the height of at least one anode-side structural element of a second bipolar plate; and/or the first bipolar plate comprises at least one cathode-side structural element having a height which is different from the height of at least one cathode-side structural element of a second bipolar plate.

According to one embodiment, a fuel cell stack is described wherein the bipolar plates comprise coolant-side structural elements for forming the coolant-side flow pathways, wherein the first bipolar plate (comprises at least one coolant-side structural element having a height which is different from the height of at least one coolant-side structural element of a second bipolar plate.

The structural elements may be arranged at a spacing from each other, so that the oxidation medium or the reduction medium/fuel or the coolant can flow through the corresponding flow field of the bipolar plate with the least possible pressure losses.

Moreover, the flow fields of the anode plate and the cathode plate as well as the coolant flow field can be individually configured independently of each other.

According to one embodiment, a fuel cell stack is described wherein the anode plate and the cathode plate comprises a metal or a conductive carbon-based material, such as graphite or a composite material made from graphite and carbon. In particular, a bipolar plate is specified wherein the anode plate and the cathode plate consist essentially of a metal or a conductive carbon-based material, such as graphite or a composite material made from graphite and carbon.

According to one embodiment, a fuel cell stack is described wherein at least one of the electrode-side structural elements comprises an elastic conductive polymer, and may consist of this.

According to one embodiment, a fuel cell stack is described wherein at least one of the coolant-side structural elements is elastic in configuration.

According to one embodiment, a fuel cell stack is described wherein the coolant-side structural elements comprise an elastic conductive polymer, and may consist of this.

The structural elements provided as described herein may consist of an elastic conductive polymer which is stable in the temperature range of the fuel cell operation. Silicones or siloxanes may be used, with polydimethylsiloxane being an example.

The polymer may have an electrical conductivity of >100 S/cm. The electrical resistance may be 0.0008 Ωcm and the modulus of compression may be less than 150 MPa, or less than 30 MPa.

According to another embodiment, a bipolar plate is described wherein one or more of the structural elements are fashioned as columns and may have a rectangular or oval cross section. Accordingly, both the anode-side structural elements and/or the cathode-side structural elements and/or the coolant-side structural elements are formed as columns and each of them may have a rectangular or oval cross section, so that a very simple fabrication is possible. Round or oval cross sections with one or two axes of symmetry are also options.

The structural elements may have cross section areas of different size, distributed across the surface of the bipolar plate, in order to satisfy different requirements for the spring force in different regions of the bipolar plate.

According to some embodiments of the bipolar plate described herein, the structurings, i.e., the arrangement of the structural elements of the anode plate and the cathode plate, are configured such that at least the contact surface of the structural elements on the respective other sides of anode plate and cathode plate are covered by the structurings, in order to distribute the pressure over the entire height of the stack.

Hence, the structural elements of the anode side and the structural elements of the cathode plate and the coolant-side structural elements are arranged directly on top of each other in the stack direction of the bipolar plates. In this way, damage to the bipolar plate can be avoided.

Further spatial configurations of the structurings of anode plate and cathode plate to optimize the flow relations are possible with no problem. An equivalent arrangement such as that of the coolant-side structural elements is an option.

The mixing of structural elements having different cross sections is possible.

The structural elements may be arranged regularly or irregularly in the coolant flow field to form flow regions, in order to avoid pressure losses and to employ the necessary spring force as needed. The structural elements in a regular arrangement may form a lattice pattern.

According to another embodiment, a bipolar plate is described wherein the anode-side structural elements are connected to the anode plate and/or the cathode-side structural elements are connected to the cathode plate. In this embodiment, the anode-side structural elements are not connected by means of an anode-side carrier plate to the anode plate and/or the cathode-side structural elements are not connected by means of a cathode-side carrier plate to the cathode plate.

According to another alternative embodiment, a bipolar plate is described wherein the anode-side structural elements are connected by means of an anode-side carrier plate to the anode plate and/or the cathode-side structural elements are connected by means of a cathode-side carrier plate to the cathode plate. The anode-side structural elements may be a single piece with the anode-side carrier plate. The cathode-side structural elements may be a single piece with the cathode-side carrier plate.

Mixed forms of the previously described embodiments can be formed. Thus, the cathode-side structural elements can be connected by means of a cathode-side carrier plate to the cathode plate, while the anode-side structural elements can be connected without a carrier plate to the anode plate. In another mixed form, the cathode-side structural elements are connected without a cathode-side carrier plate to the cathode plate, while the anode-side structural elements are connected by means of a carrier plate to the anode plate. These carrier plates have a structured side with the structural elements and a substantially flat opposite side without the structural elements. The carrier plate is connected to the anode plate or to the cathode plate by the flat side without the structural elements.

According to another embodiment, a bipolar plate is described wherein the coolant-side structural elements are connected to both the anode plate and to the cathode. According to this embodiment, the coolant-side structural elements are not part of a carrier plate. The structural elements may be glued, for example, to at least the anode plate or the cathode plate, whereby a one-sided gluing may make the assembly of the bipolar plates easier and is generally sufficient. A gluing to the cathode plate carrying the oxidation agent is an option.

According to an alternative embodiment, a bipolar plate is described wherein the coolant-side structural elements are part of a coolant-side carrier plate. The coolant-side structural elements may be a single piece with the coolant-side carrier plate. This carrier plate comprises a structured side with the structural elements and a substantially flat opposite side without the structural elements. The carrier plate is connected either to the anode plate or to the cathode plate by the flat side without the structural elements.

According to another embodiment, a bipolar plate is described wherein the anode-side structural elements and/or the cathode-side structural elements are formed as columns.

According to another embodiment, a vehicle is described wherein the vehicle comprises a fuel cell stack having bipolar plates as described herein.

Aspects of the different embodiments of the invention that are mentioned in this application may be combined with each other, unless otherwise stated in an individual case.

BRIEF DESCRIPTION OF THE SEVERAL VIEWS OF THE DRAWINGS

Embodiments of the invention are explained with the aid of the corresponding drawings.

DETAILED DESCRIPTION

Figure 1:
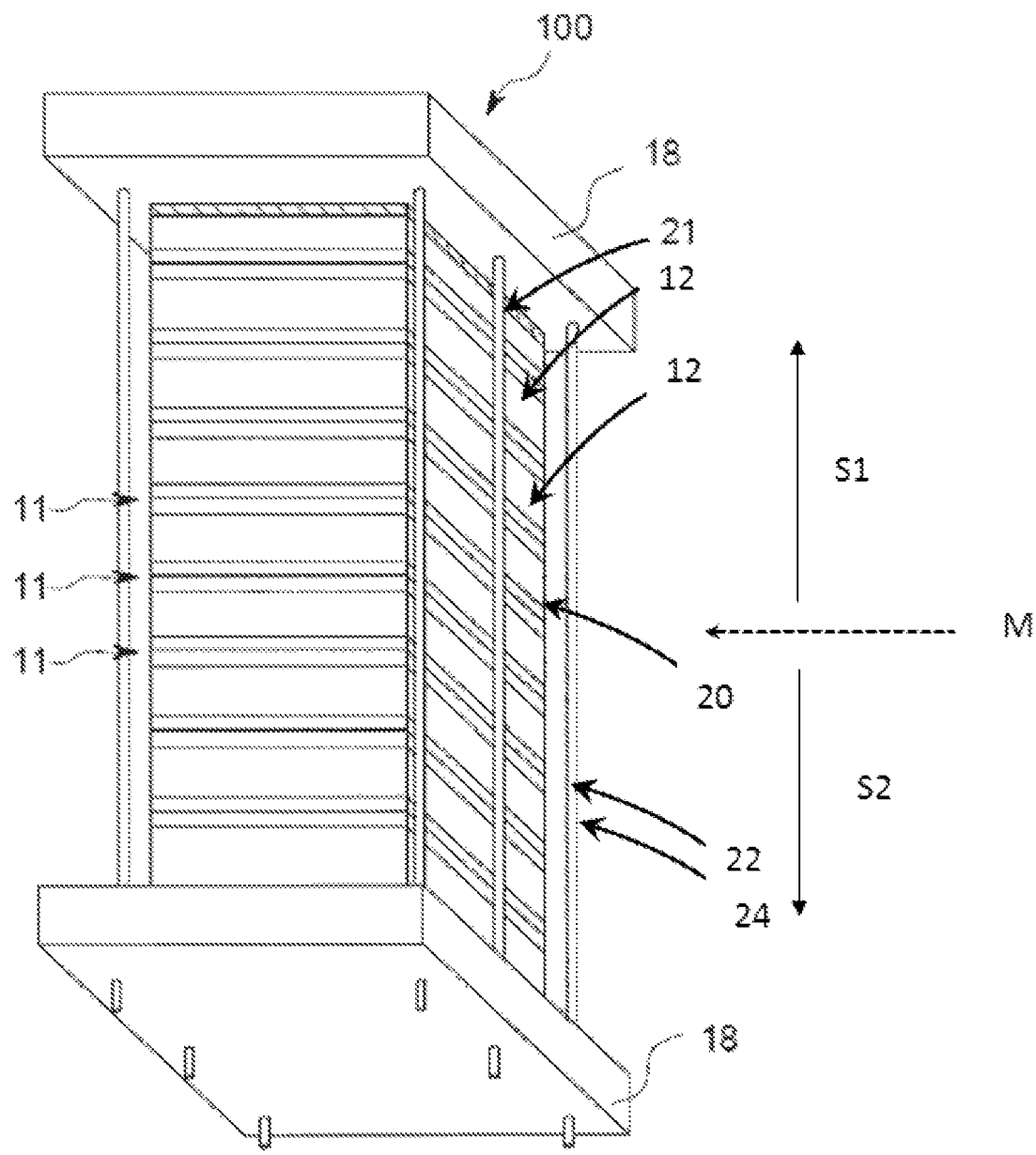
FIG. 1 shows a schematic representation of a fuel cell stack.

FIG. 1 shows in a schematic representation a fuel cell stack designated overall as 100. The fuel cell stack 100 is part of a vehicle, especially an electric vehicle, having an electric traction motor which is supplied with electrical energy by the fuel cell stack 100.

The fuel cell stack 100 comprises a plurality of membrane electrode assemblies 10 and bipolar plates 12 arranged in a row (stacked) in alternating manner at their flat sides. Thus, multiple stacked individual cells 11 form the fuel cell stack 100 overall, while both one of the individual cells 11 and also the fuel cell stack 100 can generally be called a fuel cell. The fuel cell stack 100 has end plates 18 on either side. Between the bipolar plates 12 and the respective membrane electrode assemblies 10 there are arranged anode and cathode spaces, not shown, being bounded by encircling seals 20. In order to ensure the sealing function of the seals 20, among other things, the fuel cell stack 100 is compressed (press-fitted) in the stack direction S by means of a clamping system.

The clamping system comprises an outer clamping device 22, as well as elastic structural elements of the bipolar plates 12, not visible here. These shall be further described in the following.

In order to create an external clamping which is transmitted to the structural elements in the fuel cell stack 100, lengthwise tension elements 24 of the outer clamping devices 22 pass on tension forces between the two end plates 18, so that the end plates 18 are pulled together by means of the tension elements 24. For this, the tension elements 24 extend in a stack direction S of the fuel cell stack 100. In this way, sizeable pressures are created inside the stack.

Figure 2:
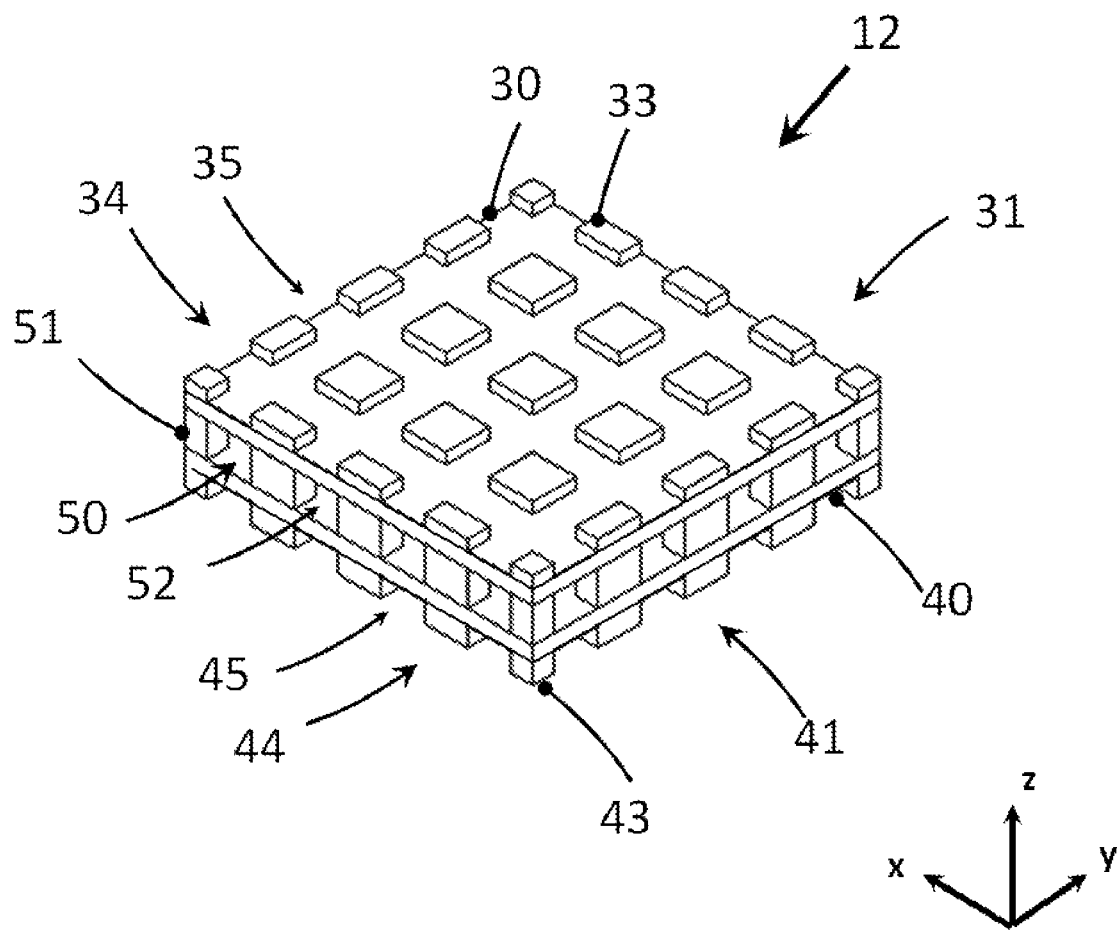
FIG. 2 shows in perspective view from above, a bipolar plate of a fuel cell stack in a first embodiment.
Figure 3:
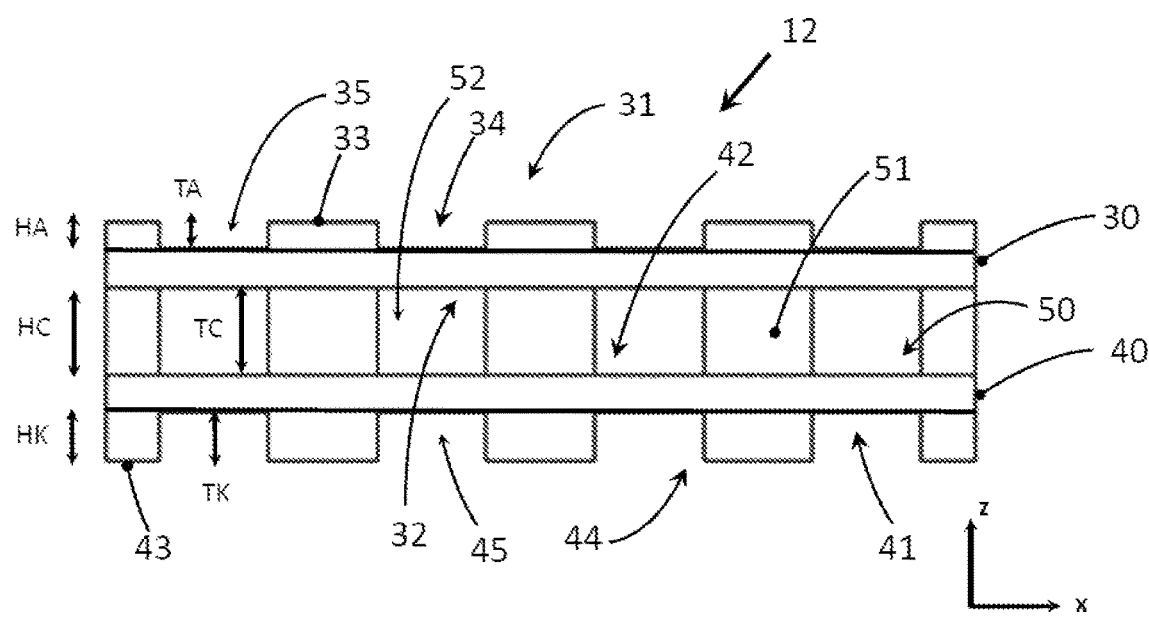
FIG. 3 shows in a sectional view, the bipolar plate of FIG. 2.

FIGS. 2 and 3 show a bipolar plate 12 in a first embodiment in various views. Each time one detail of the bipolar plate 12 is shown.

The bipolar plate 12 here comprises two individual plates, an anode plate 30 and a cathode plate 40. The anode plate 30 has an anode side 31 and a coolant side 32, pointing toward the cathode plate 40. The cathode plate 40 has a cathode side 41 and a coolant side 42 pointing toward the anode plate 30. In order to form a coolant flow field 50, coolant-side structural elements 51 are arranged each time on the coolant side 32, 42 between the anode plate 30 and the cathode plate 40, each of them contacting the anode plate 30 and the cathode plate 40. The structural elements 51 are in the form of columns and have a square cross section. These are evenly distributed and thus form flow pathways 52 in the shape of a lattice network, through which a coolant can flow in the lengthwise and transverse direction, relative to a principal axis of the bipolar plate 12.

Figure 4:
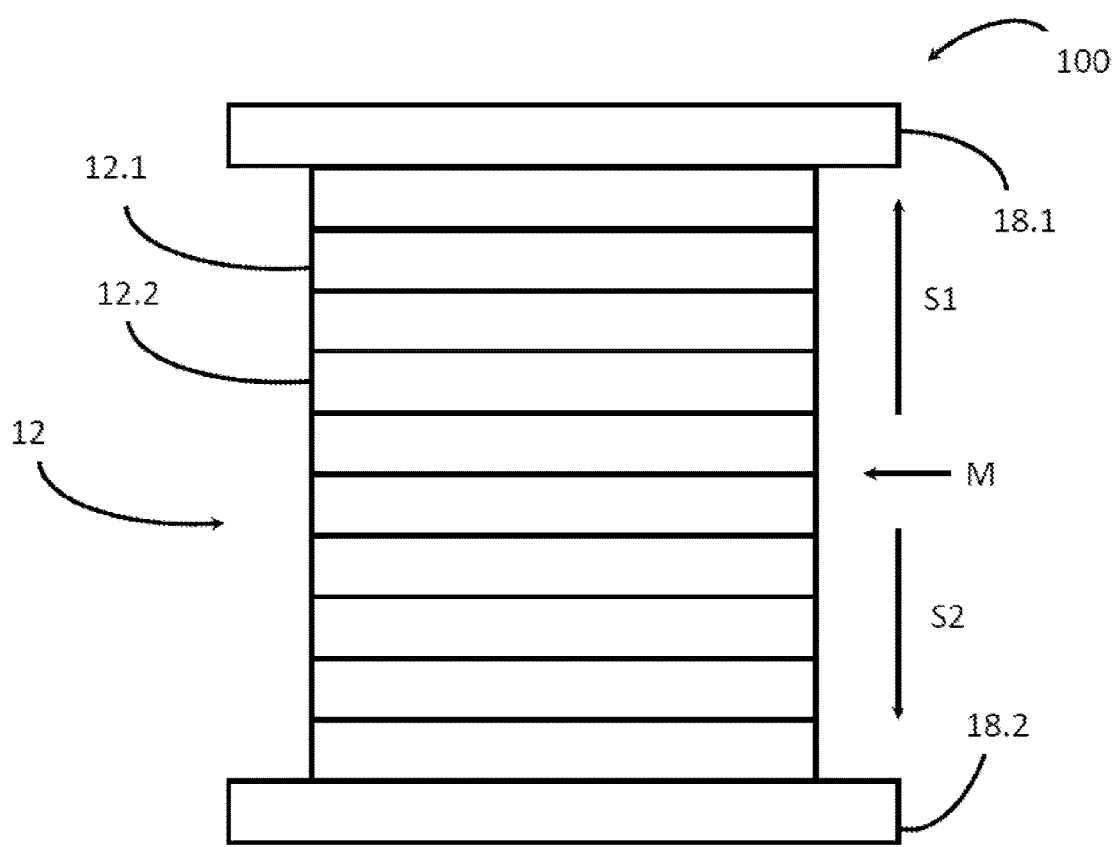
FIG. 4 shows in a schematic side view, a fuel cell stack showing the position of a first bipolar plate and a second bipolar plate.

Anode-side structural elements 33 and cathode-side structural elements 43 are provided on the anode side 31 and cathode side 41 facing away from the coolant flow field 50, both of them being configured similar to the coolant-side structural elements 51 of the coolant flow field 50 and forming an anode flow field 34 and a cathode flow field 44, respectively. That is, they are in the form of columns with a square cross section. This does not rule out the structural elements having a different form of cross section. The bipolar plate 12 comprises at least one anode-side flow pathway 35 having a path depth TA. Furthermore, the bipolar plate 12 comprises cathode-side flow pathways 45 having a path depth TK. Moreover, the bipolar plate 12 comprises coolant-side flow pathways 52 having a path depth TC. FIG. 4 now shows the relative arrangement of a first bipolar plate 12.1 and a second bipolar plate 12.2. The first bipolar plate 12.1 comprises at least one anode-side flow pathway TA having a path depth TA, which is different from the path depth TA of at least one anode-side flow pathway 35 of the second bipolar plate 12.2. Furthermore, the first bipolar plate 12.1 may comprise at least one cathode-side flow pathway 45 having a path depth TK, which differs from the path depth TK of at least one cathode-side flow pathway TK of the second bipolar plate 12.2. Moreover, the first bipolar plate 12.1 may comprise at least one coolant-side flow pathway 52 having a path depth TC, which differs from the path depth TC of at least one coolant-side flow pathway TC of a second bipolar plate 12.2.

The first bipolar plate 12.1 is situated closer in a first stack direction S1 to a first end plate 12.1 of the fuel cell stack 100 than to the second bipolar plate 12.2, as can likewise be seen from FIG. 4. At least one of the coolant-side flow pathways 52 of the first bipolar plate 12.1 may have a lesser depth TC than the depth TC of at least one of the coolant-side flow pathways 52 of the second bipolar plate 12.2. This makes possible better control of the heat removal. The first stack direction S1 here designates the direction from the middle level M of the stack to the first end plate 18.1. A second stack direction S2 the direction from the middle level M of the stack to the second end plate 18.2.

The anode-side structural elements 33 have a height HA. The cathode-side structural elements 43 have a height HK. The coolant-side structural elements 51 have a height HC. The heights HA, HK, HC correspond respectively to the depths TA, TK, TC.

Figure 5:
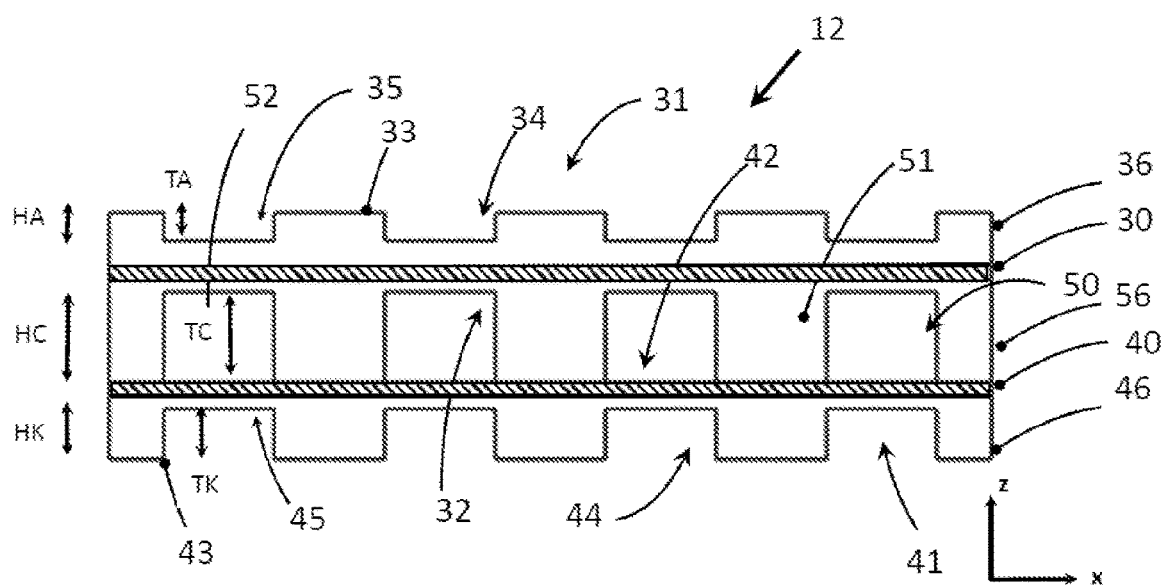
FIG. 5 shows in a sectional view, a bipolar plate of a fuel cell stack in a second embodiment.
Figure 6:
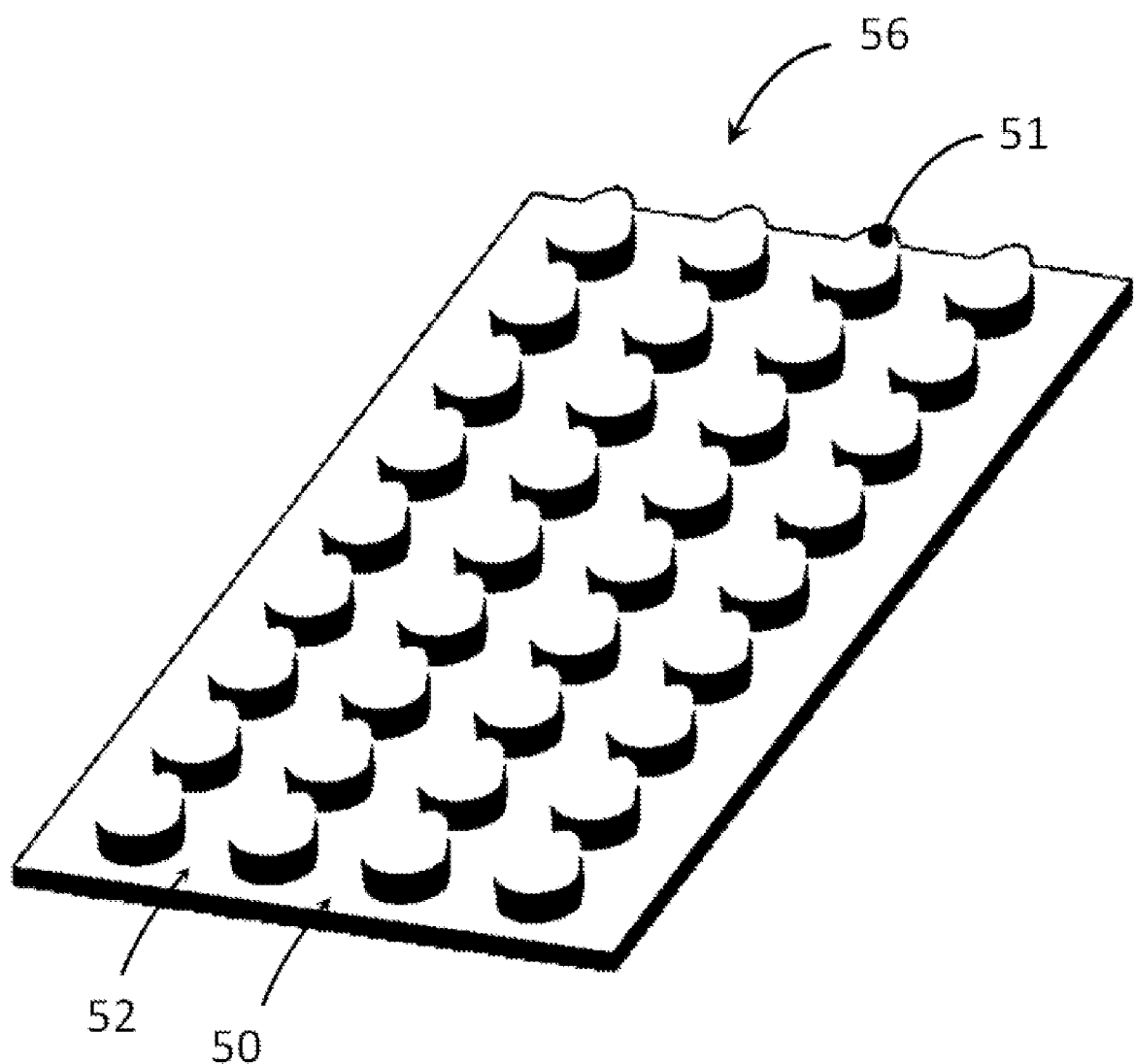
FIG. 6 shows in a front view, structural elements having a basically oval cross section on a carrier plate for a bipolar plate of a fuel cell stack.

FIG. 5 in turn shows a detail of a bipolar plate 12 according to second configuration in cross section. In this configuration, the structural elements 51 form a single piece with a carrier plate 56, which lies by its flat side against the coolant side 42 of the cathode plate 40. The use of this carrier plate 56 makes the assembly of the bipolar plate 12 much easier. Also in this variant a gluing of the carrier plate 56 or the structural elements 51 can be done. Moreover, in this embodiment the anode-side structural elements 33 are formed as a single piece with an anode-side carrier plate 36, which lies by its flat side against the anode side 31 of the anode plate 30. The use of this carrier plate 36 further makes the assembly of the bipolar plate 12 much easier. Moreover, in this embodiment the cathode-side structural elements 43 are also formed as a single piece with a cathode-side carrier plate 46, which lies by its flat side against the cathode side 41 of the cathode plate 40. The use of this carrier plate 46 further makes the assembly of the bipolar plate 12 much easier. Thus, viewed as a whole, the embodiment shown in FIG. 6 differs from the embodiment shown in FIGS. 2 and 3 in that the structural elements 33, 43, 51 are placed not directly, but rather by means of carrier plates 36, 46, 56, on the anode plate 30 or on the cathode plate 40.

Unless otherwise explicitly stated, the remarks pertain equally to all of the embodiments.

Again, aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A fuel cell stack, comprising:
a stack of membrane electrode assemblies and bipolar plates situated in alternating manner between two end plates of the fuel cell stack,
wherein the bipolar plates each comprise an anode plate having an anode side and a coolant side, a cathode plate having a cathode side and a coolant side, a plurality of electrode-side flow pathways having path depths, and a plurality of coolant-side flow pathways having path depths, and
wherein a first one of the bipolar plates is situated in a stack direction closer to a first end plate of the two end plates of the fuel cell stack than a second one of the bipolar plates, and wherein the first one of the bipolar plates comprises at least one cathode-side flow pathway having a path depth which is greater than a path depth of at least one cathode-side flow pathway of the second one of the bipolar plates based on being closer to the first end plate.

2. The fuel cell stack according to claim 1, wherein each of the first one and second one of the bipolar plates comprises at least one coolant-side flow pathway, and wherein at least one of the coolant-side flow pathways of the first one of the bipolar plates that is closer to the first end plate of the fuel cell stack has a lesser depth than a depth of at least one of the coolant-side flow pathways of the second one of the bipolar plates.

3. The fuel cell stack according to claim 1, wherein the bipolar plates comprise anode-side structural elements for forming anode-side flow pathways, and cathode-side structural elements for forming the cathode-side flow pathways, and
wherein:
the first one of the bipolar plates comprises at least one anode-side structural element having a height which is different from a height of at least one anode-side structural element of the second one of the bipolar plates; and/or
the first one of the bipolar plates comprises at least one cathode-side structural element having a height which is different from a height of at least one cathode-side structural element of the second one of the bipolar plates.

4. The fuel cell stack according to claim 3, wherein the anode-side structural elements are connected to the anode plate and/or the cathode-side structural elements are connected to the cathode plate.

5. The fuel cell stack according to claim 3, wherein the anode-side structural elements are connected by an anode-side carrier plate to the anode plate and/or the cathode-side structural elements are connected by a cathode-side carrier plate to the cathode plate.

6. The fuel cell stack according to claim 1, wherein the bipolar plates comprise coolant-side structural elements for forming coolant-side flow pathways, and
wherein the first one of the bipolar plates comprises at least one coolant-side structural element having a height which is different from a height of at least one coolant-side structural element of the second one of the bipolar plates.

7. The fuel cell stack according to claim 6, wherein the coolant-side structural elements are formed as columns.

8. The fuel cell stack according to claim 6, wherein the coolant-side structural elements have a rectangular or oval cross section.

9. The fuel cell stack according to claim 6, wherein the coolant-side structural elements are connected to both the anode plate and to the cathode plate.

10. The fuel cell stack according to claim 6, wherein the coolant-side structural elements are part of a coolant-side carrier plate.

11. The fuel cell stack according to claim 1, wherein:
the first one of the bipolar plates comprises at least one anode-side flow pathway having a path depth, which is different from a path depth of at least one anode-side flow pathway of the second one of the bipolar plates; and/or
the first one of the bipolar plates comprises at least one coolant-side flow pathway having a path depth, which is different from a path depth of at least one coolant-side flow pathway of the second one of the bipolar plates.

12. A vehicle having a fuel cell system that comprises a fuel cell stack, the fuel cell stack including:
a stack of membrane electrode assemblies and bipolar plates situated in alternating manner between two end plates of the fuel cell stack,
wherein the bipolar plates each comprise an anode plate having an anode side and a coolant side as well as a cathode plate having a cathode side and a coolant side as well as a plurality of electrode-side flow pathways having path depths and a plurality of coolant-side flow pathways having path depths, and
wherein a first one of the bipolar plates is situated in a stack direction closer to a first end plate of the two end plates of the fuel cell stack than a second one of the bipolar plates, and wherein the first one of the bipolar plates comprises at least one cathode-side flow pathway having a path depth which is greater than a path depth of at least one cathode-side flow pathway of the second one of the bipolar plates based on being closer to the first end plate.

13. The vehicle of claim 12, wherein:
the first one of the bipolar plates comprises at least one anode-side flow pathway having a path depth, which is different from a path depth of at least one anode-side flow pathway of the second one of the bipolar plates; and/or
the first one of the bipolar plates comprises at least one coolant-side flow pathway having a path depth, which is different from a path depth of at least one coolant-side flow pathway of the second one of the bipolar plates.

* * * * *